(12) United States Patent
Feng

(10) Patent No.: US 8,353,090 B2
(45) Date of Patent: Jan. 15, 2013

(54) SEAL ATTACH PRESS TOOL

(75) Inventor: Xiangyang Feng, Singapore (SG)

(73) Assignee: HGST, Netherlands B.V., Amsterdam (NL)

( * ) Notice: Subject to any disclaimer, the term of this patent is extended or adjusted under 35 U.S.C. 154(b) by 1096 days.

(21) Appl. No.: 12/135,974

(22) Filed: Jun. 9, 2008

(65) Prior Publication Data

US 2009/0300899 A1 Dec. 10, 2009

(51) Int. Cl.
*B23P 11/02* (2006.01)
(52) U.S. Cl. .............. 29/244; 29/451; 29/270; 29/278
(58) Field of Classification Search ........... 29/255–280, 29/252, 244, 451, 509
See application file for complete search history.

(56) References Cited

U.S. PATENT DOCUMENTS

| | | | | | |
|---|---|---|---|---|---|
| 739,342 | A | * | 9/1903 | Peregrine | 140/109 |
| 1,544,601 | A | * | 7/1925 | Schade | 12/103 |
| 2,095,931 | A | * | 10/1937 | Kraft | 152/370 |
| 2,661,487 | A | * | 12/1953 | Hicks et al. | 12/103 |
| 2,860,535 | A | * | 11/1958 | Fowler | 81/8.1 |
| 3,928,902 | A | * | 12/1975 | Seims et al. | 29/221.5 |
| 4,005,737 | A | * | 2/1977 | Nason | 140/109 |
| 4,229,870 | A | * | 10/1980 | Tate | 29/254 |
| 4,241,487 | A | * | 12/1980 | Kraver | 29/278 |
| 4,730,378 | A | * | 3/1988 | Sweeny et al. | 29/278 |
| 4,765,048 | A | * | 8/1988 | Hokanson | 29/221.5 |
| 4,868,966 | A | * | 9/1989 | Campbell et al. | 29/270 |
| 4,907,811 | A | * | 3/1990 | Nash et al. | 277/551 |
| 4,910,821 | A | * | 3/1990 | Kieferle | 7/158 |
| 5,062,323 | A | * | 11/1991 | Roberts et al. | 81/15.7 |
| 5,090,102 | A | * | 2/1992 | Lovell | 29/255 |
| 5,127,143 | A | * | 7/1992 | Urlacher | 29/235 |
| 5,174,006 | A | | 12/1992 | Ellis | |
| 5,299,347 | A | * | 4/1994 | Decker | 29/235 |
| 5,311,911 | A | * | 5/1994 | Krausser et al. | 138/89 |
| 5,544,402 | A | * | 8/1996 | O'Neil | 29/261 |
| 5,636,427 | A | * | 6/1997 | Lyle | 29/453 |
| 5,870,814 | A | * | 2/1999 | Herron | 29/402.08 |
| 5,890,271 | A | * | 4/1999 | Bromley et al. | 29/263 |
| 6,131,260 | A | * | 10/2000 | Catt | 29/235 |
| 6,468,455 | B1 | | 10/2002 | Kobayashi | |
| 6,694,591 | B2 | * | 2/2004 | Rullmann et al. | 29/450 |
| 6,941,632 | B1 | * | 9/2005 | Mead et al. | 29/424 |

(Continued)

FOREIGN PATENT DOCUMENTS

JP 62175986 8/1987

(Continued)

OTHER PUBLICATIONS

Tomtec, "Tip Seal Replacement Procedure", http://www.tomtec.com/pages/applocations/pdf/tipsealreplacement.pdf, 4 pages.

(Continued)

*Primary Examiner* — Jermie Cozart
*Assistant Examiner* — Bayan Salone

(57) ABSTRACT

A press tool and method for attaching a seal to a surface are described. The seal attach press tool comprises a contact member having a curved contact surface, e.g., an arced surface. In a process of attaching a seal over an opening on a surface, the curved contact surface of the contact member is rolled over and in contact with the surface of the seal, thereby facilitating bonding the seal to the surface. According to an embodiment, the curved contact surface of the contact member comprises an elastomer and/or is covered with an elastomer pad.

6 Claims, 7 Drawing Sheets

U.S. PATENT DOCUMENTS

| | | | |
|---|---|---|---|
| 7,526,865 B2 * | 5/2009 | Mueller | 30/123 |
| 7,636,996 B2 * | 12/2009 | Chen | 29/263 |
| 8,066,714 B2 * | 11/2011 | Shipp et al. | 606/99 |
| 8,156,668 B2 * | 4/2012 | Garrett et al. | 38/102.91 |
| 8,209,832 B1 * | 7/2012 | Anderson et al. | 29/244 |
| 2002/0116009 A1 * | 8/2002 | Fraser et al. | 606/99 |
| 2003/0028197 A1 * | 2/2003 | Hanson et al. | 606/99 |
| 2003/0083664 A1 * | 5/2003 | Rogers et al. | 606/79 |
| 2005/0081361 A1 | 4/2005 | Miyahara | |
| 2007/0233153 A1 * | 10/2007 | Shipp et al. | 606/99 |

FOREIGN PATENT DOCUMENTS

| | | |
|---|---|---|
| JP | 03161199 | 7/1991 |
| JP | 2003035369 | 2/2003 |
| JP | 2005088144 | 4/2005 |
| JP | 2006300114 | 11/2006 |

OTHER PUBLICATIONS

EK Success, "Rub on Tool" http://eksuccess.com/products_deatil.php?product_id=5918&sess_id=e1bf79eb4153bb5969f85d0ddadd0ac, 1 page.

* cited by examiner

SEAL ATTACH PRESS TOOL

TECHNICAL FIELD

Embodiments of the invention relate generally to the field of tools and, more specifically, to a seal attach press tool.

BACKGROUND ART

Electronic computing devices have become increasingly important to data computation, analysis and storage in our modern society. Modern direct access storage devices (DASDs), such as hard disk drives (HDDs), are heavily relied on to store mass quantities of data for purposes of future retrieval. As such long term data storage has become increasingly popular, and as the speed of microprocessors has steadily increased over time, the need for HDDs with greater storage capacity to store the increased amount of data has also steadily increased.

Hard disk drive devices include a chassis or base for housing disk drive components. Several disk drive components, such as the hard disks and the read/write heads, should have an uncontaminated environment in which to operate. To avoid contamination, the chassis is designed with a minimum of openings to the external environment. However, most HDD devices have one or more openings in the chassis for pressure equalization purposes as well as to reach internal components during various stages of manufacturing, for a non-limiting example, to perform a servo track write process with the hard disks after the hard disks are installed within the chassis. Thus, HDD devices as well as manner other types of devices are configured with seals bonded over such openings, to prevent contamination from entering the HDD via the openings. Often, such seals are designed to be applied to the chassis with a press force.

One traditional approach to applying a seal to an HDD chassis involves pressing the seal with a press tool designed with a soft flat contact surface. One drawback to this approach is that the force applied to the HDD via this press tool is relatively large. Such a large applied force may result in a HDD quality problem if excessive force is applied at the HDA (Hard Drive Assembly) level, i.e., to the sealed chamber in which the internal components are housed. Furthermore, a separate tooling fixture is needed to implement this approach.

Another traditional approach to applying a seal to an HDD chassis involves rubbing the seal with a rubbing tool designed with a hard flat contact surface. One drawback to this approach is generation of high triboelectric charges resulting from friction involved with the rubbing process. This approach also experiences a relatively high contamination rate due to the rapid wear and tear on the rubbing tool, and its overall effectiveness leaves room for improvement.

Based at least on the foregoing, there is a need in the art for an improved tool and methodology for attaching a seal to a surface, generally, and to a HDD chassis, specifically.

SUMMARY OF EMBODIMENTS OF THE INVENTION

A press tool and method for attaching a seal to a surface are described. The seal attach press tool comprises a shaft and a contact member having a curved contact surface, e.g., an arced surface. In a process of attaching a seal over an opening on a surface, the curved contact surface of the contact member is rolled over and in contact with the surface of the seal, thereby bonding the seal to the surface. According to an embodiment, the curved contact surface of the contact member comprises an elastomer and/or is covered with an elastomer pad.

BRIEF DESCRIPTION OF THE DRAWINGS

The accompanying drawings, which are incorporated in and form a part of this specification, illustrate embodiments of the invention and, together with the description, serve to explain the principles of the invention. The drawings are used merely to illustrate principles of the illustrated embodiments, and it is understood that components described in these embodiments have not been drawn to scale.

DETAILED DESCRIPTION OF EMBODIMENTS OF THE INVENTION

Figure 1:
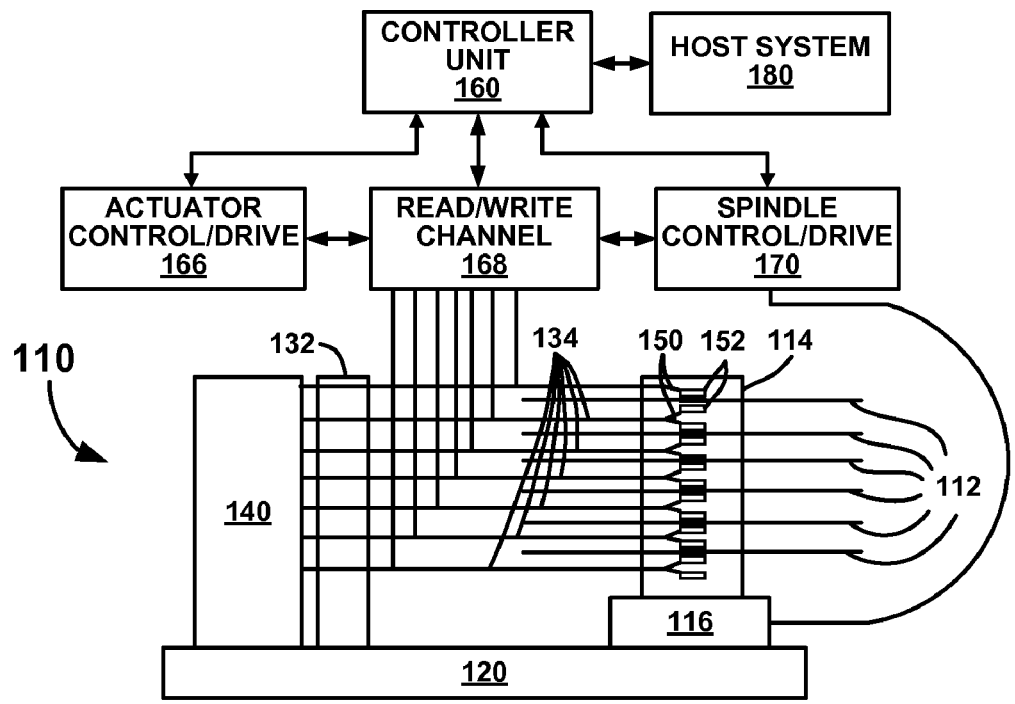
FIG. 1 illustrates a side view of a disk drive system, according to an embodiment of the invention.

Reference will now be made in detail to embodiments of the present technology, examples of which are illustrated in the accompanying drawings. While the technology will be described in conjunction with various embodiments, it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well known methods, procedures, and components have not been described in detail as not to unnecessarily obscure aspects of the present invention.

Overview

Embodiments of the invention include a press tool for attaching a seal to a surface, such as for attaching a seal over an opening in the surface. According to an embodiment, the seal attach press tool comprises a shaft and a contact member having a curved contact surface. According to an embodiment, the curved contact surface of the contact member comprises an elastomer, such as rubber, and/or is covered with an elastomer pad.

According to an embodiment, in a method for attaching a seal over an opening on a surface, the curved contact surface of the contact member is rolled over and in contact with the surface of the seal, thereby bonding the seal to the surface.

The shape of the seal being attached may vary based on design needs and may be more geometrically complex than a simple circle. Furthermore, the contact surface of the press tool is preferably configured with a counterpart profile shape that matches the shape of the corresponding seal for which the tool is designed. Thus, the shape of the press tool contact member may vary from implementation to implementation. The tool and methods described herein may be used, for a non-limiting example, to bond a seal to a hard disk drive chassis.

It should be understood by those skilled in the art that various embodiments of the invention increase the success and effectiveness of attaching a seal to a hard disk drive (HDD) chassis and the effectiveness of the seal itself. For example, embodiments of the invention minimize generation of triboelectric charge, potential for contamination of the sealed device, and the level of force needed to be applied to the sealed device to attach the seal to the device, as well as provide a higher quality seal bonding.

Numerous specific embodiments will now be set forth in detail to provide a more thorough understanding of the present technology. The discussion of these detailed embodiments will begin with an overview of a hard disk drive (HDD), and the components connected therein, according to embodiments of the invention. The discussion will then focus on embodiments of the invention involving a press tool for attaching seals to a surface, and related methods of use.

Although embodiments of the present invention will be described in conjunction with a seal in a hard disk drive device, it is understood that the embodiments described herein are useful outside of the art of HDD design, manufacturing and operation. The utilization of the HDD seal example is only one embodiment and is provided herein merely for purposes of brevity and clarity.

Hard Disk Drive (HDD) Configuration

Figure 2A:
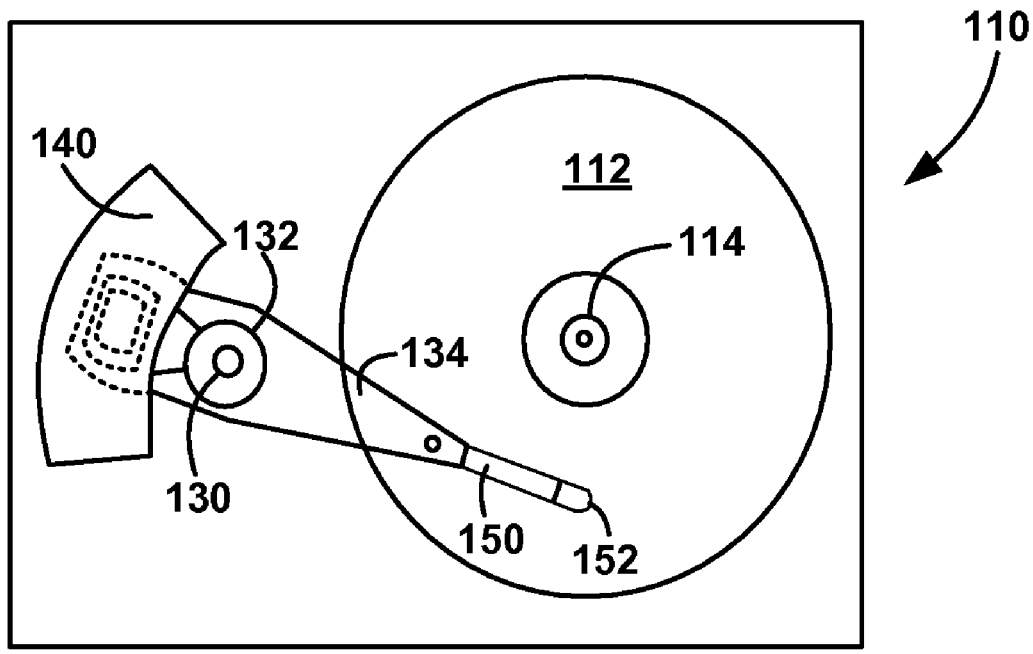
FIG. 2A illustrates a top view of a disk drive system, according to an embodiment of the invention.
Figure 2B:
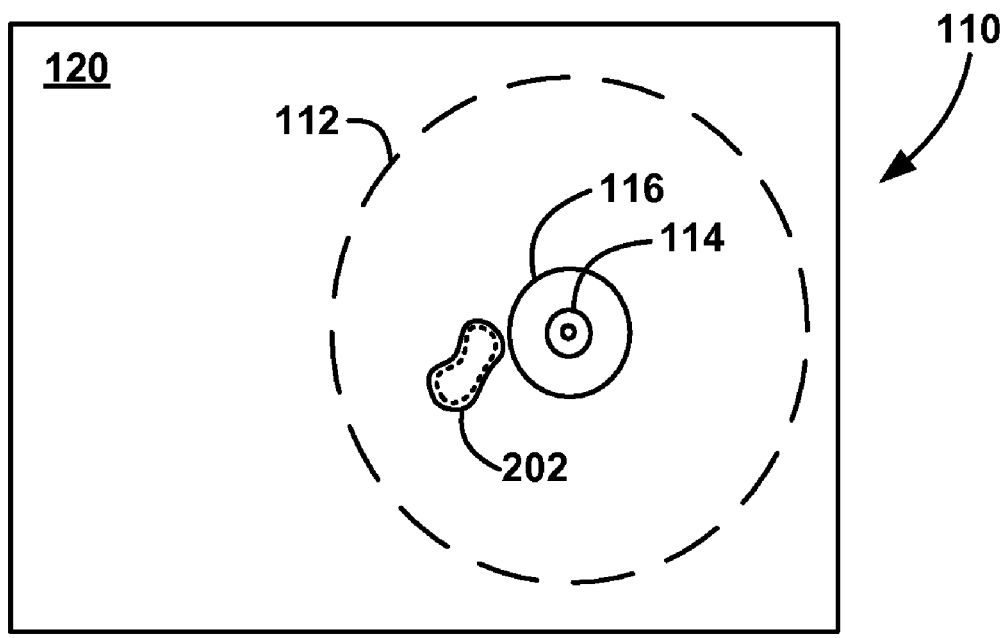
FIG. 2B illustrates a bottom view of a disk drive system, according to an embodiment of the invention.

FIG. 1, FIG. 2A and FIG. 2B shows a side view, a top view, and a bottom view, respectively, of a disk drive system designated by the general reference number 110. The disk drive system 110 comprises a plurality of stacked magnetic recording disks 112 mounted to a spindle 114. The disks 112 may be conventional thin film recording disks or other magnetically layered disks. The spindle 114 is attached to a spindle motor 116, which rotates the spindle 114 and disks 112. A chassis 120 provides a housing for the disk drive system 110. The spindle motor 116 and an actuator shaft 130 are attached to the chassis 120. A hub assembly 132 rotates about the actuator shaft 130 and supports a plurality of actuator arms 134. A rotary voice coil motor 140 is attached to chassis 120 and to a rear portion of the actuator arms 134.

A plurality of suspension assemblies 150 are attached to the actuator arms 134. A plurality of heads or transducers on sliders 152 are attached respectively to the suspension assemblies 150. The sliders 152 are located proximate to the disks 112 so that, during operation, the heads or transducers are in electromagnetic communication with the disks 112 for reading and writing. The rotary voice coil motor 140 rotates actuator arms 134 about the actuator shaft 130 in order to move the suspension assemblies 150 to the desired radial position on disks 112. The shaft 130, hub 132, arms 134, and motor 140 may be referred to collectively as a rotary actuator assembly.

A controller unit 160 provides overall control to system 110. Controller unit 160 typically includes (not shown) a central processing unit (CPU), a memory unit and other digital circuitry, although it should be apparent that one skilled in the computer arts could also enable these aspects as hardware logic. Controller unit 160 is connected to an actuator control/drive unit 166 that in turn is connected to the rotary voice coil motor 140. This configuration also allows controller 160 to control rotation of the disks 112. A host system 180, typically a computer system, is connected to the controller unit 160. The host system 180 may send digital data to the controller 160 to be stored on disks 112, or it may request that digital data at a specified location be read from the disks 112 and sent to the system 180. The basic operation of DASD units is well known in the art and is described in more detail in The Magnetic Recording Handbook, C. Dennis Mee and Eric D. Daniel, McGraw-Hill Book Company, 1990.

FIG. 2B depicts a seal 202 attached to chassis 120. The particular seal 220 depicted in the example of FIG. 2B is located over an opening in chassis 120 over the disks 112, where the opening facilitates a servo track write process typically performed during manufacturing of the HDD system. Illustration of seal 202 is presented for purposes of example and, therefore, the actual shape, size, and purpose of a seal attached to a HDD chassis (or to any other surface) is not limited and may vary from implementation to implementation. As mentioned, most HDD devices have one or more openings in the chassis to reach internal components during various stages of manufacturing. Therefore, such openings may need to be sealed with a seal such as seal 202.

Press Tool for Seal Attach

Figure 3A:
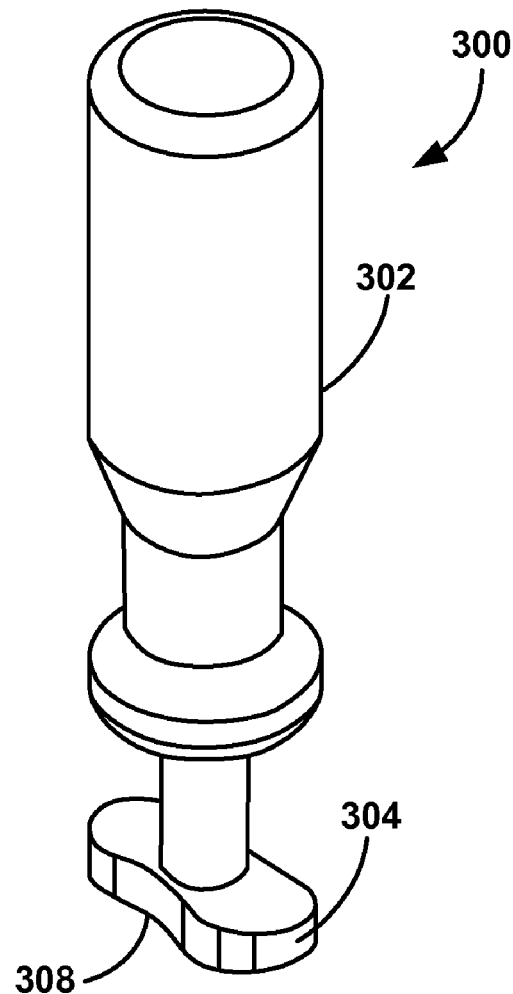
FIG. 3A illustrates an isometric view of a seal attach press tool, according to an embodiment of the invention.

FIG. 3A illustrates an isometric view of a seal attach press tool 300 (hereinafter referred to simply as "press tool"), according to an embodiment of the invention. Press tool 300 comprises a shaft 302 and a contact member 304. According to an embodiment, the contact member 304 is fabricated as a whole part with the shaft 302, i.e., the shaft 302 and contact member 304 are monolithic in form. In an alternative embodiment, the contact member 304 is fabricated separately from the shaft 302 and attached to the shaft 302 via a fastener, for non-limiting examples, a screw, a press fit, etc. Therefore, contact member 304 may be readily decoupled from shaft 302, such as for operational purposes.

The shaft 302 is depicted in FIG. 3A as being multi-faceted to facilitate hand use, such as like the handle on a screwdriver. However, the configuration of shaft 302 need not be as depicted in FIG. 3A, i.e., shaft 302 could be mono-cylindrical. Therefore, the configuration of shaft 302 may vary from implementation to implementation. For example, shaft 302 may be designed for automated use in a tool fixture and, therefore, shaft 302 may be implemented with a shape matching such fixture.

The contact member 304 is depicted in FIG. 3A as being a particular shape, e.g., in a profile viewing from its bottom, to match the corresponding seal for which press tool 300 is designed. For example, contact member 304 is depicted as having a "bean shape" generally corresponding to the shape of a counterpart seal such as seal 202 (FIG. 2B). However, the profile of contact member 304 need not be as depicted in FIG. 3A and may vary from implementation to implementation.

Figure 3B:
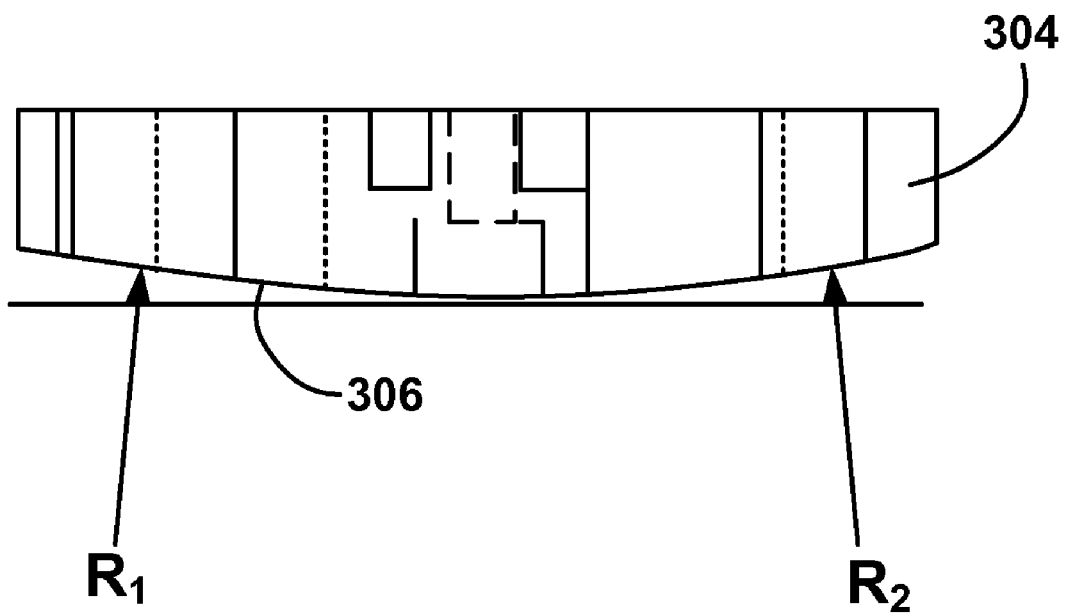
FIG. 3B illustrates a side view of contact member of a seal attach press tool, according to an embodiment of the invention.

FIG. 3B illustrates a side view of contact member 304 of press tool 300, according to an embodiment of the invention. Significantly, contact member 304 has a curved contact surface 306, as depicted by radius $R_1$ and radius $R_2$. In a seal attach operation, the contact surface 306 is the surface of press tool 300 that mates with, and through which force is applied to, a corresponding seal and part of the surface to which the seal is being attached (e.g., the rim of an opening covered by the seal). According to an embodiment, the contact surface 306 is an arced surface and, therefore, $R_1$ equals $R_2$. However, the curvature associated with contact surface 306 need not be arcuate, and may vary from implementation to implementation. For example, contact surface 306 may be implemented such that $R_1$ is not equal to $R^2$. Furthermore, contact surface 306 may be curved in multiple directions, e.g., contact surface 306 may be curved in the longitudinal direction of contact surface 306 (as shown in FIG. 3B) as well as in a transverse direction of contact surface 306, or in non-orthogonal directions. That is, the shape of contact surface 306 may be implemented with a relatively complex three-dimensional curvature, and/or a relatively complex two-dimensional profile, if the need arises.

According to an embodiment, at least the contact surface 306 of contact member 304 is made of an elastomer, such as rubber. For example, the entire contact member 304 could be made from an elastomeric material or only the contact surface 306 could be made of an elastomeric material integrated with contact member 304.

According to an embodiment, the contact surface 306 of contact member 304 is coupled with an elastomer pad 308 (FIG. 3A), such as a rubber pad. Elastomer pad 308 is coupled to the contact member 304 and covers the contact surface 306. Thus, in operation, the elastomer pad 308 is in direct contact with the seal. The manner in which elastomer pad 308 is coupled to the contact member 304 may vary from implementation to implementation. For example, the elastomer pad 308 may be attached to the contact member 304 using double-side tape or other temporary fastener so that the elastomer pad 308 is readily removable from the contact member 304, e.g., for replacement purposes.

Attaching s Seal Over an Opening on a Surface

Figure 4:
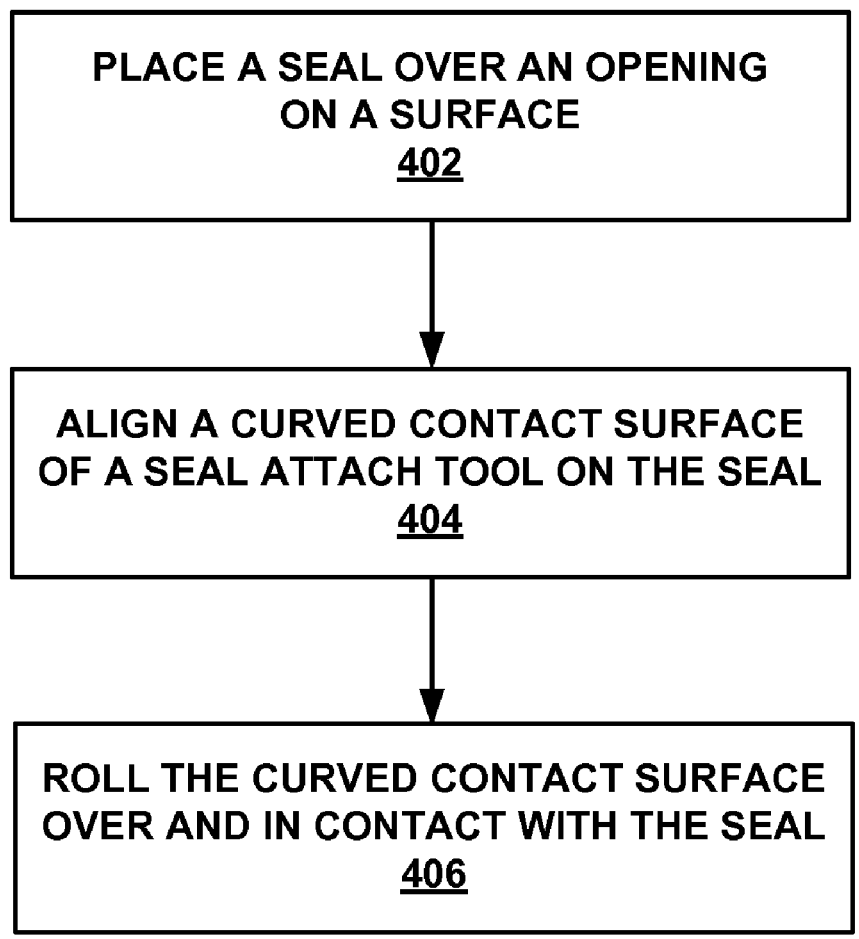
FIG. 4 is a flowchart illustrating a method for attaching a seal over an opening on a surface, according to an embodiment of the invention.

FIG. 4 is a flowchart illustrating a method for attaching a seal over an opening on a surface, according to an embodiment of the invention.

At block 402, a seal is placed over an opening in a surface. For example, a tool is used to pick up, place and align seal 202 (FIG. 2B) over the servo-track write opening in chassis 120 of HDD 110. At block 404, a curved contact surface of a press tool is aligned on or over the seal. For example, curved contact surface 306 (FIG. 3B) of contact member 304 (FIG. 3A), fitted with elastomer pad 308 (FIG. 3B) is aligned with seal 202. At block 406, the curved contact surface is rolled over and in contact with the seal, whereby the rolling assists in coupling, e.g., bonding, the seal to the surface. For example, curved contact surface 306 is rolled over the seal 202 to bond a portion of the seal 202 to the rim of the opening in chassis 120 and to create a sealed situation between the seal 202 and the chassis 120. Use of the term "roll" is not meant to imply a single cycle of rolling in a given direction, rather, the curved contact surface may be rolled over and in contact with the seal multiple times.

Figure 5:
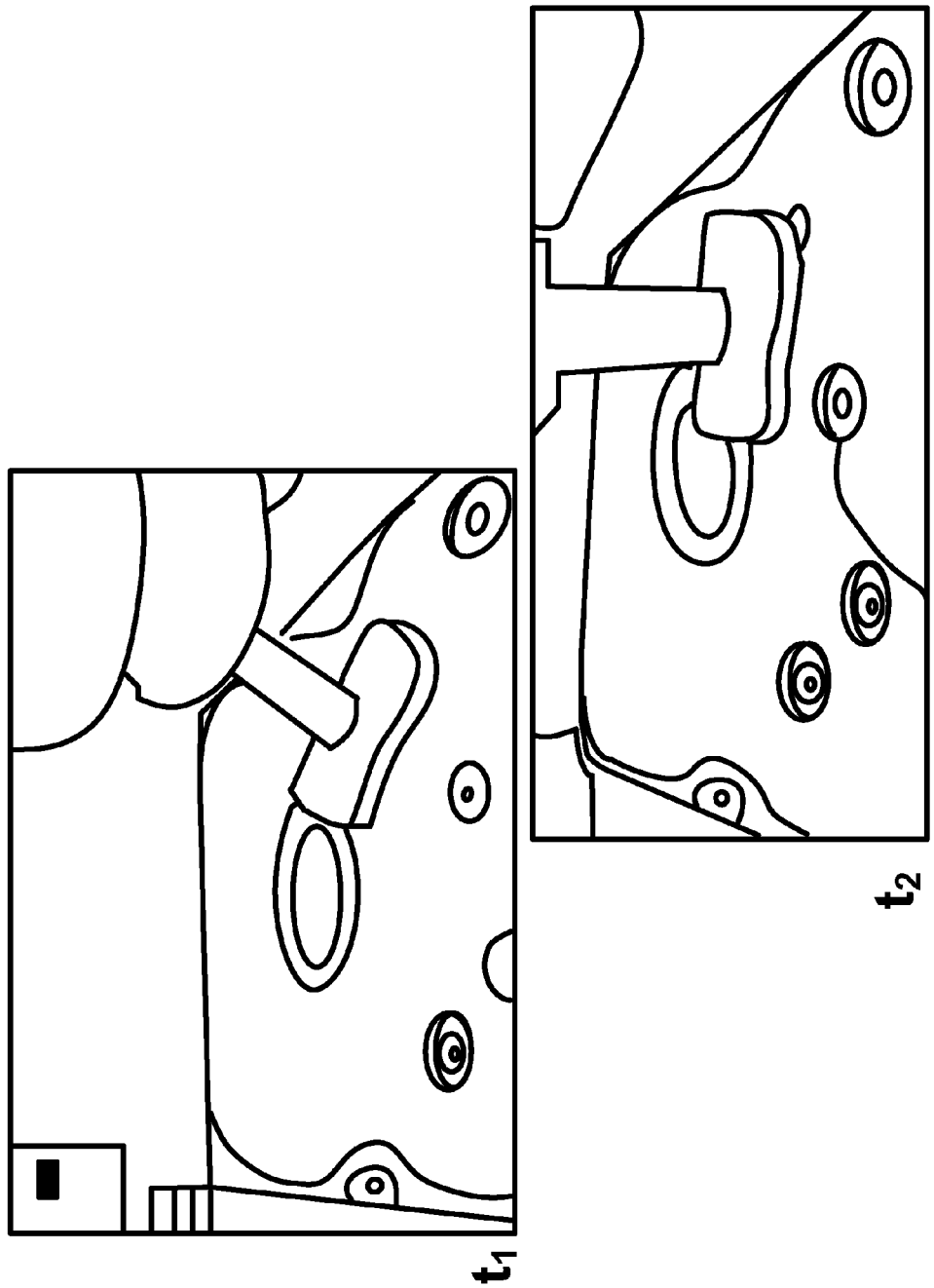
FIG. 5 is a set of diagrams illustrating rolling of a curved contact surface of a press tool over a seal to attach the seal to a surface, according to an embodiment of the invention.

FIG. 5 is a set of diagrams illustrating an example of rolling a curved contact surface of a press tool over a seal to attach the seal to a surface, according to an embodiment of the invention. The example of FIG. 5 illustrates rolling the press tool along the longitudinal axis of the press tool, about a lateral axis, at time $t_1$ and at time $t_2$. The seal attach process may also involve rolling the press in a lateral direction to ensure an effective seal, e.g., with a contact member and contact surface that is curved in multiple directions.

It should be understood that although various embodiments of the present invention are described in the context of a press tool for attaching a seal to a hard disk drive (HDD) device, the foregoing embodiments are merely exemplary of various implementations of principles of the present technology. Therefore, it should be understood that various embodiments of the invention described herein may apply to any devices, configurations, or systems in which seals, e.g., planar seals, are employed.

The foregoing descriptions of specific embodiments of the present invention are presented for purposes of illustration and description. They are not intended to be exhaustive or to limit the invention to the precise forms disclosed, and many modifications and variations are possible in light of the above teachings. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A press tool for attaching a seal to a surface, comprising:
a shaft; and
a contact member-comprising a convex curved contact surface, wherein said contact member is coupled orthogonally to said shaft, wherein said seal has a first planar shape and a counterpart profile shape corresponding to said convex curved contact surface of said contact member substantially matches said first planar shape.

2. The press tool recited in claim 1, wherein at least said convex curved contact surface of said contact member comprises an elastomer.

3. The press tool recited in claim 1, further comprising:
an elastomer pad coupled to said convex curved contact surface of said contact member.

4. The press tool recited in claim 1, further comprising:
a rubber pad coupled to said convex curved contact surface of said contact member.

5. The press tool recited in claim 1, wherein said shaft and said contact member are monolithic in form.

6. The press tool recited in claim 1, wherein, in attaching said seal to said surface, said contact member is rolled over said seal.

* * * * *

UNITED STATES PATENT AND TRADEMARK OFFICE
CERTIFICATE OF CORRECTION

PATENT NO. : 8,353,090 B2  
APPLICATION NO. : 12/135974  
DATED : January 15, 2013  
INVENTOR(S) : Xiangyang Feng Page 1 of 1

It is certified that error appears in the above-identified patent and that said Letters Patent is hereby corrected as shown below:

In the Claims:

Column 6, Claim 1, Line 31: Delete "member-comprising"  
Insert --member comprising--

Signed and Sealed this  
Twenty-fifth Day of June, 2013

Teresa Stanek Rea  
*Acting Director of the United States Patent and Trademark Office*